United States Patent [19]

Ruhlin

[11] Patent Number: 5,100,590

[45] Date of Patent: Mar. 31, 1992

[54] METHOD OF FORMING AN OPTHALMIC LENS FROM A SYNTHETIC MATERIAL BLANK

[75] Inventor: Raymond Ruhlin, Clamart, France

[73] Assignee: Essilor International Cie Generale d'Optique, Creteil, France

[21] Appl. No.: 420,949

[22] Filed: Oct. 13, 1989

[30] Foreign Application Priority Data

Oct. 27, 1988 [FR] France .................. 88 14046

[51] Int. Cl.⁵ .............................. B29D 11/00
[52] U.S. Cl. ..................... 264/2.7; 264/1.1; 425/808
[58] Field of Search ............... 264/1.1, 2.7; 425/808

[56] References Cited

U.S. PATENT DOCUMENTS

| | | | |
|---|---|---|---|
| 2,298,429 | 10/1942 | Smith | 264/2.4 |
| 2,304,663 | 12/1942 | Smith et al. | 264/2.4 |
| 2,332,674 | 10/1943 | Smith | 425/808 |
| 2,333,051 | 10/1943 | Smith | 425/808 |
| 2,373,201 | 4/1945 | Smith | 425/808 |
| 3,380,718 | 4/1968 | Neefe | 425/808 |
| 3,423,488 | 1/1969 | Bowser | 264/221 |
| 3,902,693 | 9/1975 | Crandon | 249/134 |
| 4,038,014 | 7/1977 | Dusza | 425/388 |
| 4,129,628 | 12/1978 | Tamutus | 264/268 |
| 4,190,621 | 2/1980 | Greshes | 425/808 |
| 4,191,717 | 3/1980 | Weber | 264/313 |
| 4,252,753 | 2/1981 | Rips | 264/1.1 |

FOREIGN PATENT DOCUMENTS

| | | | |
|---|---|---|---|
| 0150537 | 8/1985 | European Pat. Off. | |
| 0195617 | 9/1986 | European Pat. Off. | |
| 1267883 | 12/1961 | France | 264/1.1 |
| 2358256 | 2/1978 | France | |
| 2380117 | 9/1978 | France | |
| 2602455 | 2/1988 | France | |
| 619384 | 3/1949 | United Kingdom | 264/2.7 |
| 675903 | 7/1952 | United Kingdom | 264/2.7 |

Primary Examiner—James Lowe
Attorney, Agent, or Firm—Longacre & White

[57] ABSTRACT

In a method of forming an ophthalmic lens from a synthetic material blank, in particular from a polycarbonate material, the blank is placed horizontally in a mold having optically finished molding surfaces. It is then subjected to a molding force at raised temperature in an oven. The mold has an upper molding surface that is part of a shell member adapted to slide freely in a ring. The molding force is limited to the static force due to the weight of the shell member, optionally increased by the weight of a pre-load mass surmounting the shell member.

13 Claims, 1 Drawing Sheet

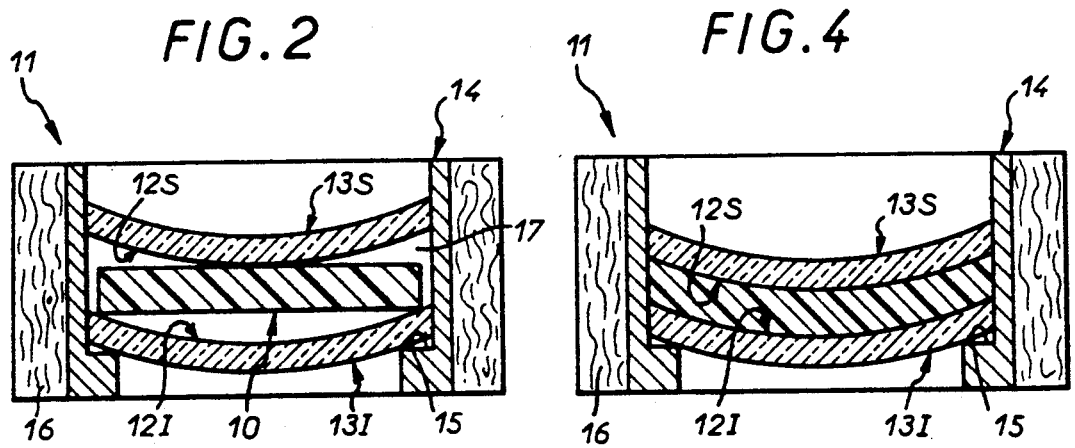
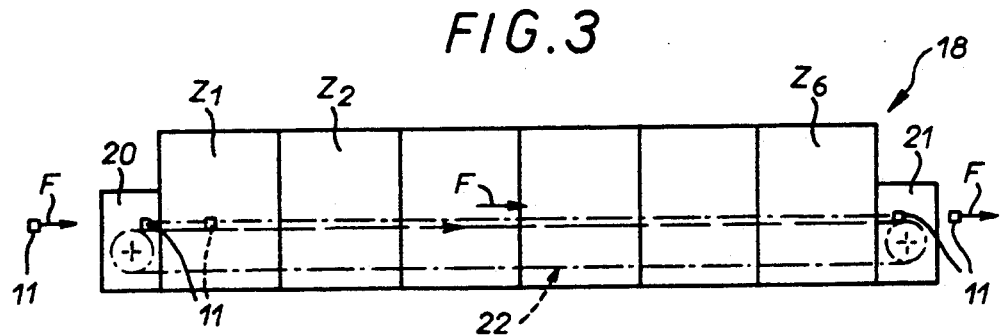
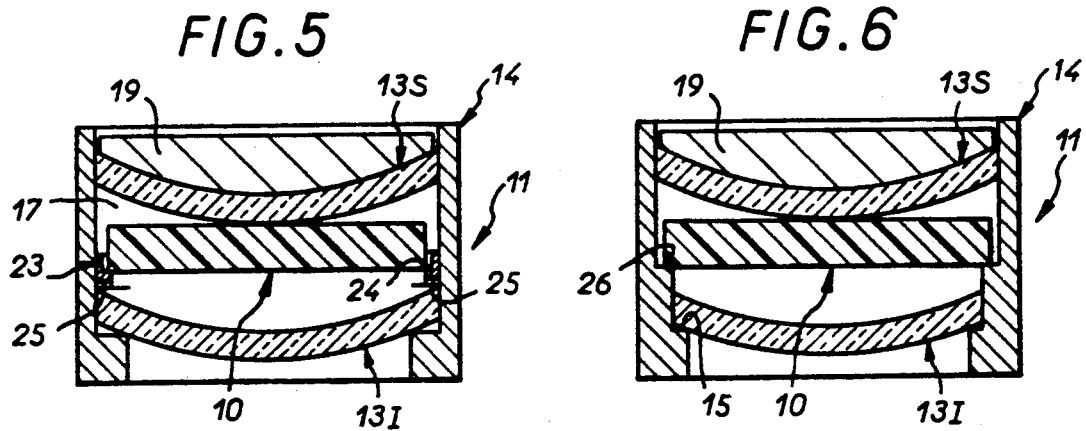

METHOD OF FORMING AN OPTHALMIC LENS FROM A SYNTHETIC MATERIAL BLANK

BACKGROUND OF THE INVENTION

1. Field of the Invention

The present invention concerns the manufacture of ophthalmic lenses from synthetic materials, for example thermoplastic materials.

It is more particularly but not necessarily exlusively directed to the case where the synthetic material is polycarbonate.

2. Description of the Prior Art

At this time polycarbonate ophthalmic lenses are injection molded or hot pressed.

The injection molding manufacturing process as described for example in French patent No 2 380 117 entails major investment; also, it is not applicable to the manufacture of thick ophthalmic lenses and, by virtue of the method of forming and cooling them, results in the presence within the ophthalmic lenses obtained of high internal stresses likely to compromise their optical qualities.

The hot pressing manufacturing process as described for example in French patent No 2 358 256 also entails major investment since, starting from a blank with parallel surfaces or a preformed crude lens, it requires not only an oven where the blank or crude lens is preheated but also a special press adapted to apply the final ophthalmic lens configuration to the crude lens at high temperature by the action of optically finished molding surfaces to which a specific molding force is applied, in practise horizontally.

Additionally, this hot pressing manufacturing process requires preheating of the molding surfaces and of the workpiece to be formed.

An object of the present invention is to provide a simple method of forming finished or semi-finished ophthalmic lenses free of any internal stresses at ambient temperature and without requiring major investment.

SUMMARY OF THE INVENTION

The present invention consists in a method of forming an ophthalmic lens from a synthetic material blank wherein said blank is placed horizontally in a mold having optically finished molding surfaces and subjected to a molding force at raised temperature, in which method the mold has an upper molding surface that is part of a shell member adapted to slide freely in a ring and the molding force is limited to the static force due to the weight of said shell member optionally increased by the weight of a pre-load mass surmounting the shell member, the whole being placed in an oven.

Due only to the effects of the raised temperature, which temperature is in practice raised during the corresponding working cycle above the vitreous transition temperature of the material concerned, and of the limited static force applied to it, the blank sags which causes it to mate intimately with the lower molding surface, against which it is applied, and the upper molding surface, which moves with it as it sags.

A simple oven is sufficient for this, a tunnel oven, for example, without any need for any kind of press.

The necessary investment is thereby advantageously and commensurately reduced.

The sagging of the blank on heating occurs in a circumferentially homogeneous manner even if it preferably affects its central area more than its peripheral area, and this normally results in no internal stresses.

The characteristics and advantages of the invention will emerge from the following description given by way of non-limiting example only with reference to the appended diagrammatic drawings.

BRIEF DESCRIPTION OF THE DRAWINGS

FIG. 1 is a perspective view of a blank to which the forming method in accordance with the invention may be applied.

FIG. 2 is a view in axial cross-section to a larger scale showing the application of this method before the forming of the blank concerned.

FIG. 3 is a diagrammatic view in elevation and to a larger scale of an oven used for this forming method.

FIG. 4 is a view in axial cross-section analagous to that of FIG. 2 after the forming has taken place.

FIG. 5 is a view in axial cross-section also analagous to that of FIG. 2 relating to a first alternative embodiment of the method in accordance with the invention.

FIG. 6 is a view in axial cross-section also analagous to that of FIG. 2 relating to a second alternative embodiment of the method in accordance with the invention.

DESCRIPTION OF THE PREFERRED EMBODIMENTS

FIG. 1 shows a blank 10 of synthetic material, of polycarbonate, for example; preferably a polycarbonate of the type sold under the trade name "MAKROLON" or "LEXAN".

The blank 10 may be obtained in the known way by cutting it out from a plate, by stamping for example, or by cutting a rod.

In the embodiment shown it has a circular peripheral contour.

However, this contour could equally well be polygonal, for example pentagonal, especially if the blank 10 is cut out from a plate and it is necessary to minimize wastage.

For forming the blank 10 to its particular final configuration the blank is placed horizontally in a mold 11 of which the upper molding surface 12S and the lower molding surface 12I are optically finished molding surfaces.

In accordance with the invention, the mold 11 is one in which the upper molding surface 12S is part of a shell member 13S mounted to slide freely in a ring 14.

In the embodiment shown the lower molding surface 12I is also part of a shell member 13I freely fitted into the ring 14 and resting under its own weight on a transverse shoulder 15 on the inside surface of the ring 14, at its base.

The molding shell members 13S, 13I have a circular peripheral contour reflecting that of the blank 10. Either or both may be equal thickness glass shell members, either shell members of ordinary glass with a relatively high thickness in the order of 6 mm, for example, or shell members of thinner glass, with a thickness in the order of 3 mm, for example, that has undergone chemical or thermal tempering.

In either case the molding surfaces 12S, 12I have preferably undergone a treatment to coat them with silane to prevent the synthetic material adhering to the molding surfaces during the forming operation.

Of course, coatings other than silane but having the same anti-adhesion properties may be considered.

As an alternative, either or both of the molding shell members 13S, 13I may be metal shell members with on the molding surfaces 12S, 12I a glass film coated with silane.

As a further alternative, the shell members may be entirely of metal with the molding surfaces 12S, 12I machined to the necessary optical polish and then treated with a mold-release agent or given an equivalent surface treatment.

Also, the molding shell members 13S, 13I are not necessarily of the same kind.

In all cases, the molding surfaces 12S, 12I of the molding shell members 13S, 13I have geometrical characteristics complementary to those required of the ophthalmic lens.

For example, the upper molding surface 12S may be a part-spherical surface.

The same may also be true of the lower molding surface 12I.

However, the lower molding surface 12I is intended to form the convex surface of the ophthalmic lens and may equally well be a surface of any kind, for example a progressive surface.

The ring 14 completes the mold 11, delimiting peripherally its internal molding volume 17. To this end it is a cylindrical ring with the same contour as the molding shell members 13S, 13I. It may be made from bronze, for example, with a synthetic material coating on its inside surface, for example a polytetrafluroethylene coating of the type designated by the trade name "TEFLON".

It may equally well be made from glass, however, in which case its internal surface is preferably coated with silane as previously explained.

Be this as it may, there is between the ring 14 and the molding shell members 13S, 13I just sufficient annular clearance for the molding shell members 13S, 13I to slide freely inside the ring 14.

In the embodiment shown in FIGS. 2 and 4 the ring 14 is thermally insulated on the outside by a thermally insulative coating 16 extending over its full height.

Before it is placed in the mold 11 the blank 10 is preferably stoved or preheated at 125° C. for 48 hours at a pressure of 20 Pa.

The blank is preferably placed in the mold in a clean atmosphere, for example an ionized atmosphere.

To place it in the mold the blank 10 is simply laid with its periphery on the lower molding shell member 13I, previously fitted into the ring 14.

The central area of the upper molding shell member 13S is then placed on the blank 10.

Of course, as an alternative to this the respective positions of the molding shell members 13S and 13I could be interchanged so that it is the lower molding surface that is the convex surface.

As schematically shown in FIG. 3 the whole is then placed in an oven 18.

Thus in accordance with the invention the molding force applied to the blank 10 during its forming is limited to the static force resulting in the embodiment shown in FIG. 2 only from the weight of the molding shell member 13S.

In the alternative embodiment shown in FIG. 5 there is added to the weight of the upper molding shell member 13S that of a pre-load mass 19 surmounting the upper molding shell member 13S for this purpose.

However, the weight of this pre-load mass 19 is small, in the order of 1 kg, for example.

In any event, the molding force to which the blank 10 is subjected remains moderate being in all cases less than 1.5 kg, for example.

In the embodiment shown in FIG. 3 the oven 18 is a tunnel oven which has a loading area 20 at its inlet end and an offloading area 21 at its outlet end. Between these it comprises a series of separate areas $Z_1, Z_2, \ldots Z_n$. There may be six of these areas, for example, the temperature in each of which is independently adjusted and monitored.

Each of these working areas $Z_1$ through $Z_n$ may have a length of 45 cm, for example.

The oven 18 further comprises a conveyor 22 for passing molds 11 each containing a blank 10 from its inlet end to its outlet end, as schematically represented by arrows F in FIG. 3.

At one point at least in the oven 18, that is to say in one at least of the areas $Z_1$ through $Z_n$ thereof, the temperature is regulated to a value that exceeds the vitreous or glass transition temperature of the synthetic material of which the blank 10 is made.

Two examples are given hereinafter by way of non-limiting example only of working cycles that have proved satisfactory for forming a blank 10 of this kind.

The temperatures indicated in degrees Celsius are those of the corresponding areas $Z_1$ through $Z_n$ of the oven 18.

EXAMPLE 1

Area 1: 290° C.
Area 2: 280° C.
Area 3: 260° C.
Area 4: 260° C.
Area 5: 260° C.
Area 6: 270° C.
linear speed of conveyor 22: 3.2 cm/min.

EXAMPLE 2

Area 1: 320° C.
Area 2: 340° C.
Area 3: 380° C.
Area 4: 380° C.
Area 5: 340° C.
Area 6: 320° C.
linear speed of conveyor 22: 8 cm/min.

Example 1 corresponds to natural sagging of the blank 10, the static load to which it is subjected resulting only from the weight of the upper molding shell member 13S as shown in FIG. 2.

Example 2 corresponds to the case where, as shown in FIG. 5, a pre-load mass 19 is placed on the upper molding shell member 13S.

At the outlet from the oven 18 there is removed from each mold 11, to be more precise from the ring 14 of each mold 11, the combination comprising the blank 10 and the two molding shell members 13S, 13I flanking it.

This combination is then annealed in an oven at 135° C. for one to six hours.

This annealing can be carried out directly in the tunnel oven 11 used for the forming operation. To this end the oven 18 may comprise, extending the conveyor 22, a second conveyor and further separate heating areas the temperature in each of which is appropriately adjusted.

The molding shell members 13S, 13I are then separated and may be reused immediately in a new working cycle.

The released blank 10 then constitutes the finished lens.

In the foregoing description it has been assumed that the finished lens has a thickness at the edge in the order of 1.5 mm and a thickness at the center in the order of 2 mm.

However, it could equally well be a semi-finished lens, that is to say a lens that has still to undergo a machining phase.

In this case the initial thickness of the blank 10 must be greater, in the order of 12 mm, for example.

In the embodiment shown in FIG. 5 a spacer ring 23 is disposed peripherally between the blank 10 and the lower molding surface 12I.

The purpose of this ring is to ensure that when the blank 10 sags on being heated it is its central area that first comes into contact with the lower molding shell member 13I. This eliminates any risk of an air pocket being trapped between the blank 10 and the lower molding shell member 13I.

The ring 23 is made from bronze or from "TEFLON" type polytetrafluroethylene, for example.

In the embodiment shown in FIG. 5 it has a transverse shoulder 24 on which the blank 10 is placed.

Thus in this embodiment the ring 23 has an L-shape transverse cross-section. As an alternative it could have a rectangular or square contour in transverse cross-section.

The ring 23 preferably further comprises at least one vent for evacuating air between the blank 10 and the lower molding shell member 13I.

In the embodiment shown in FIG. 5 this is a radial groove 25 in its lower surface.

In practice the ring would comprise a plurality of such grooves 25, appropriately distributed in the circumferential direction.

In the embodiment shown in FIG. 6 the ring 14 has a second shoulder 26 above the first shoulder 15 adapted to receive and support the blank 10.

The shoulder 26 fulfils the same function as the previously described ring 23.

It will be noted that in all cases the method in accordance with the invention is advantageously adapted to continuous implementation.

Of course, the invention is not limited to the embodiments described and shown but encompasses any variant execution thereof.

For example, a programmable oven might be used in place of the tunnel oven for carrying out the forming and annealing operations.

Further, instead of being simply cut out of a plate, and therefore having parallel planar faces as illustrated, the starting lens blank may be pre-formed and have, for example, parallel spherical faces, in order to speed and facilitate the forming method disclosed herein.

I claim:

1. A method for forming finished or semi-finished ophthalmic lens from a synthetic material blank comprising the steps of:
   providing a mold having a upper and lower optically finished molding surfaces, said upper molding surface being formed on a shell member, and a ring receiving the shell member;
   placing the blank into the mold above the lower molding surface;
   introducing the shell member into the ring over the blank so that the shell member can freely bear against the blank;
   placing the entire mold into an oven; and
   subjecting the mold to raised temperature and applying exclusively static molding force through the upper shell blank to cause the member to sag under the static molding force and mate intimately with the lower molding surface and with the upper molding surface as the shell member moves downwardly in the ring.

2. A method according to claim 1, wherein before placing the blank into the mold another shell member defining the lower molding surface is placed inside the ring.

3. A method according to claim 1, wherein said method includes the step of heating the blank before placing it into the mold.

4. A method according to claim 3, wherein the placing of the blank into the mold is carried out in a clean atmosphere.

5. A method according to claim 1, wherein the mold is displaced through the oven and passes through at least one zone where the temperature exceeds the transition temperature of the blank material.

6. A method according to claim 1, wherein the blank is placed inside the mold at a level above the molding surface so as to be initially out of contact with the lower molding surface.

7. A method according to claim 2, wherein the ring is thermally insulated before being placed into the oven.

8. A method according to claim 2, wherein said method includes the step of after forming the blank subjecting the blank to annealing before removing the formed blank from the mold.

9. A method according to claim 1, wherein the static force applied by the shell member is less than 1.5 kg.

10. A method according to claim 1, wherein said method includes the step of applying a pre-load mass to the shell member prior to the mold going into the oven, and the static force is that of the combined weight of the upper member and the pre-load mass.

11. A method according to claim 1, wherein the lower molding surface is of concave configuration and the upper molding surface is of convex configuration, and the blank is held out of contact with the lower molding surface when it is loaded in the mold.

12. A method according to claim 1, wherein the lens blank is heated in an oven prior to loading in the mold.

13. A method according to claim 1, wherein the lens is performed to an intermediate configuration prior to loading in the mold.

* * * * *